United States Patent [19]

Seitz

[11] Patent Number: 4,527,047
[45] Date of Patent: Jul. 2, 1985

[54] ELECTRICALLY HEATABLE BACKING MEANS FOR MIRRORS

[75] Inventor: Rudolf Seitz, Nuremberg, Fed. Rep. of Germany

[73] Assignee: Flabeg GmbH, Fürth, Fed. Rep. of Germany

[21] Appl. No.: 543,788

[22] Filed: Oct. 20, 1983

[30] Foreign Application Priority Data

Nov. 30, 1982 [DE] Fed. Rep. of Germany ... 8233516[U]

[51] Int. Cl.³ ............................................... H05B 3/22
[52] U.S. Cl. .................................... 219/219; 219/505; 219/202
[58] Field of Search ............... 219/219, 202, 504, 505, 219/345, 522

[56] References Cited

U.S. PATENT DOCUMENTS

| | | | |
|---|---|---|---|
| 3,307,167 | 2/1967 | Race | 219/504 |
| 3,720,807 | 3/1973 | Ting | 219/504 |
| 3,996,447 | 12/1976 | Bouffard | 219/505 |
| 4,237,366 | 12/1980 | Berg | 219/219 |
| 4,404,463 | 9/1983 | Eder | 219/219 |

FOREIGN PATENT DOCUMENTS

| | | |
|---|---|---|
| 073521 | 5/1982 | European Pat. Off. . |
| 80341317 | 4/1981 | Fed. Rep. of Germany . |
| 81255675 | 12/1981 | Fed. Rep. of Germany . |
| 3042419 | 8/1982 | Fed. Rep. of Germany . |
| 82142521 | 9/1982 | Fed. Rep. of Germany . |
| 2919968 | 9/1982 | Fed. Rep. of Germany . |
| 2054329 | 2/1981 | United Kingdom . |

Primary Examiner—Roy N. Envall, Jr.
Assistant Examiner—Teresa J. Walberg
Attorney, Agent, or Firm—Spencer & Frank

[57] ABSTRACT

A multiple component electrical heating device for mirrors including at least one plate-shaped electrical heating element having two main faces being connected with two of at least three metal strips which are spaced from one another and extend parallel with each other, in an electrical current-conducting and heat-conducting manner. A first one of the two main faces of the heating element is in electrical current- and heat-conducting contact with at least a first one of the metal strips and is electrically and heat-insulated from the two strips next adjacent the first metal strip. A metal bridge connects with one another, in electrical current- and heat-conducting contact, the two metal strips next adjacent the first metal strip. The other main face of the heating element is in electrical current- and heat-conducting contact with the metal bridge.

2 Claims, 3 Drawing Figures

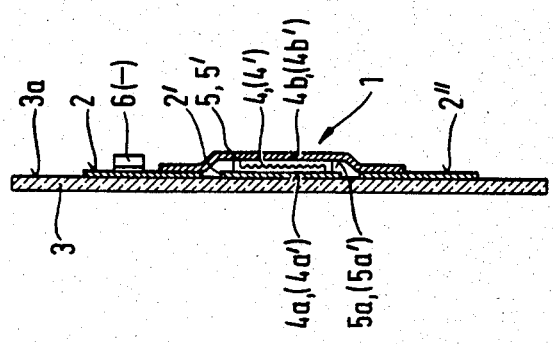
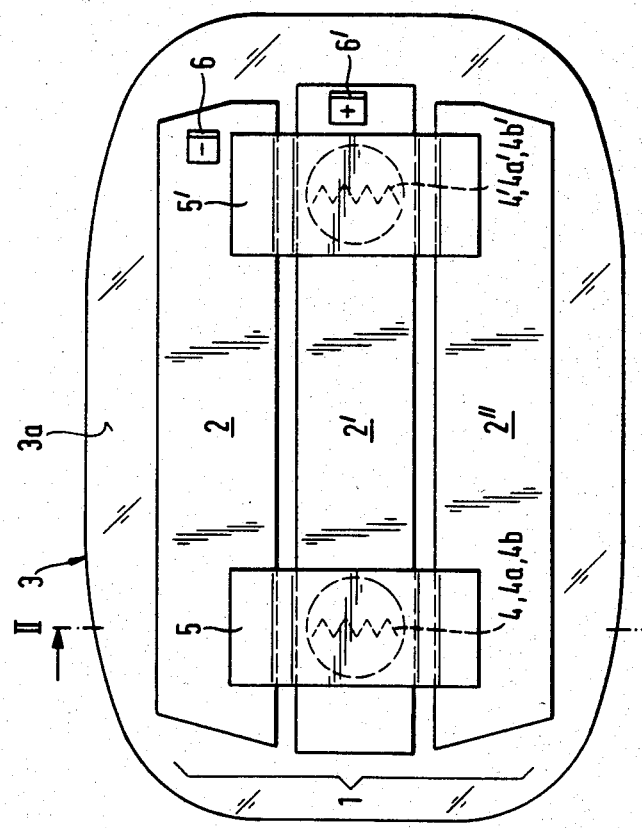

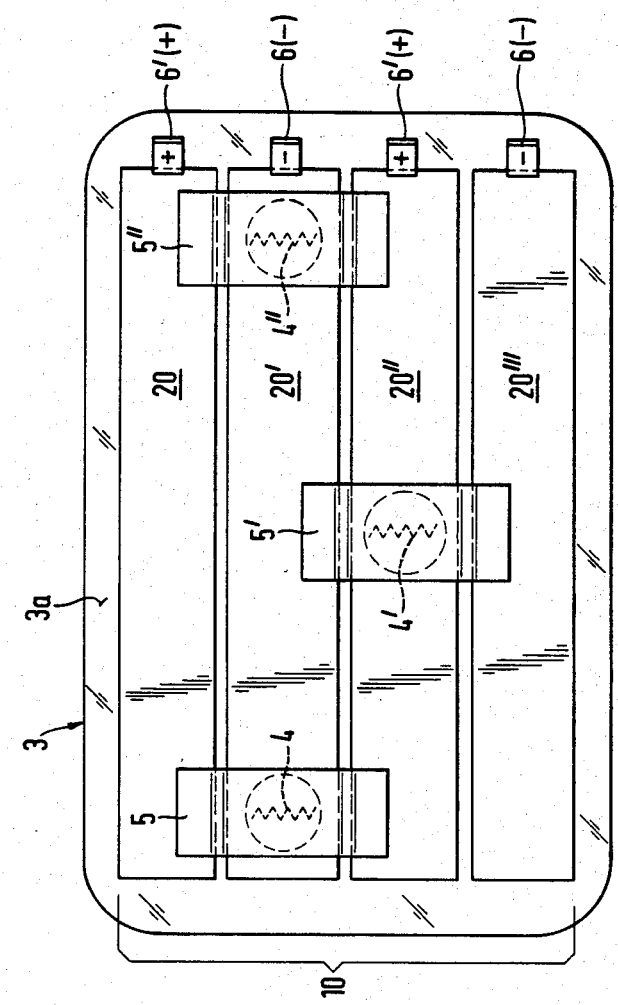

ELECTRICALLY HEATABLE BACKING MEANS FOR MIRRORS

BACKGROUND OF THE INVENTION

The invention relates to a multi-component electrically heatable backing means for mirrors, comprising thin metal sheet means and at least one plate-shaped electrical heating element having two main faces being connected with said metal sheet means in an electrical current- and heat-conducting manner.

Such heatable backing means are, for instance, known from German Pat. No. 29 19 968. They serve in particular for heating the external mirrors of motor vehicles, but can also be used for other mirrors such as, for instance, bathroom mirrors. The metal sheet means serve for distributing over the entire surface of the mirror heat which is generated in a small surface area by the heating elements, thereby preserving the mirror at least substantially free from fogging or ice formation.

It is particularly desirable in the case of the external mirrors of motor vehicles that the center of such mirror is heated first, thereby ensuring that at least a part of the mirror surface of an ice-covered mirror becomes usable already after a short heating period. The desired heat-distribution can be attained by a corresponding dimensioning of the thickness of the backing material as well as the width of the heatable backing means.

Heatable backing means of the above-described kind are usually produced from thin metal sheet, for instance copper sheet or aluminum foil. The sheets or foils are glued on to the back of a mirror. Heating elements mostly used consist of small plate-shaped bodies of ceramic masses containing a resistor whose resistance increases with increasing temperature over the temperature range in question (so-called PTC elements). The metal sheets or foils serve at the same time as electrical current feed-in to the heating elements, wherefor their arrangement must be such that the metal sheets or foils should cover the two main faces of a plate-shaped heating element, i.e., the two flat faces, and be in current- and heat-conducting connection therewith.

In the case of German Pat. No. 29 19 968, the metal sheets are of such shape and so arranged that they overlap with formation of stripes, the heating elements being arranged between the overlapping zones of the sheets.

The known heatable backing means for mirrors suffer from the drawback that they must be specifically cut to fit the size of the mirror. This leads to disadvantages during manufacture, when the backing means are to be applied simultaneously with the manufacture of the mirror. But there ensue even more significant drawbacks for the manufacturer and the dealer, and last not least for the user, when the heatable backings are offered in commerce as retro-fitting parts, which are to be glued by the user himself on to the back of a mirror. In this case, the maintenance of stores of a great variety is necessary in order to cover mirrors of any size likely to occur. Moreover, the user may have to acquire several sizes, if he wants to equip different mirrors with heatable backings.

OBJECTS AND SUMMARY OF THE INVENTION

The invention aims to solve the problem of developing further and improving the known multi-component heatable backings of mirrors in such a manner as to provide heatable backing means for the equipment of mirrors of different shapes and sizes, which means comprise only a few predetermined building units.

This object is attained, in accordance with the present invention, by providing a multi-component electrical heating means for mirrors, as initially described, in which the said metal sheet means consist essentially of at least three metal strips which are spaced from one another and extend parallel with each other, the aforesaid heating element has a first one of its two main faces in electrical current- and heat-conducting contact with at least a first one of the said metal strips and is electrically and heat-insulated from the two strips next adjacent the said first metal strip, and which heating means comprise a metal bridge connecting with one another, in electrical current- and heat-conducting contact, the said two strips next adjacent said first metal strip; the other main faces of the said heating element being in electrical current- and heat-conducting contact with the said metal bridge.

In a preferred embodiment of the heating means according to the invention, those metal strips which are directly connected with a main surface of one or several heating elements, have a width at least equal with the diameter of the respective heating element.

Thus, the invention resides in the combination of the above-described several features which must be present in common in the novel multiple component heating means.

By subdividing the heatable backing means into at least three parallel metal strips, arranged spaced from each other, as well as bridges, the backs of mirrors having different widths and shapes can be easily covered. If three strips are not sufficient to this end, a fourth or a fifth strip or several more can be added, and the necessary heating elements can be arranged in correspondence with the desired heat distribution. Instead of the mentioned metal strips, strips of other conductive materials such as metal fabric, conductive synthetic resin material and the like can be used.

It has been found to be advantageous, if the metal strips which are in direct connection with a main face of one or several heating elements, are of a width equal to the diameter of the respective heating element. The widths of the other metal strips can deviate from this width; e.g., they can be broader. As the bridges will be subject to the last-mentioned rule, i.e., they will be in direct contact with one of the main faces of the heating elements, it is recommended that the breadth of the bridges corresponds approximately with the diameter of the respective heating element.

BRIEF DESCRIPTION OF THE DRAWING

The invention will be explained in more detail in the following description thereof having reference to the accompanying drawing in which FIG. 1 is a plan view of the back of a mirror, bearing a three-strip heatable backing means;

FIG. 2 is a cross-sectional view of the same embodiment, taken along a plane indicated by II—II in FIG. 1; and FIG. 3 is a plan view of the back of another mirror, bearing a four-strip heatable backing means.

DETAILED DESCRIPTION OF THE EMBODIMENTS SHOWN IN THE DRAWING

The entire heatable backing means according to the invention, a first embodiment of which is shown in FIGS. 1 and 2 a second embodiment of which is shown in FIG. 3, are designated by the reference numerals 1 and 10, respectively. In the first embodiment, these backing means consist of the three metal strips 2, 2' and 2" which are arranged spaced from, and parallel with each other, on the back wall 3a of a mirror 3. The backing means 1 further comprise two disc-shaped electrical heating elements 4 whose two main faces (large, flat faces) 4a and 4b are connected with different metal strips in an electric current- and heat-conducting manner. Thus, each heating element 4, 4' is connected by means of its main faces 4a and 4a' which latter are turned toward the back 3a of the mirror 3, with the central strip 2' in electrical current- and heat-conducting contact.

The strips 2 and 2" which are next adjacent the central strip 2' are connected with each other by means of metal bridges 5 and 5' in an electrical current- and heat-conducting manner, and the main faces 4b and 4b' which are turned away from the back 3a of the mirror 3, are in electrical current- and heat-conducting contact with the undersides 5a and 5a' of the metal bridges 5 and 5', respectively (FIG. 2).

In the backing means according to the invention as shown in FIGS. 1 and 2, the metal strips 2, 2' and 2" thus do not only serve as means for the distribution of heat, but also as the means for supplying electrical current.

For this purpose connecting posts 6 and 6' can be provided on the metal strips, so that posts 6 can, for instance, be connected with the minus pole of a motor car battery while the posts 6' can be connected to the plus pole of the same current source. As is shown in FIG. 1, the two heating elements 4 and 4' can thus be connected in parallel and electric current will flow through them at the same time and in the same direction.

In the embodiment shown in FIG. 3, the backing means 10 comprise four metal strips 20, 20', 20" and 20"' and three heating elements 4, 4' and 4", as well as three bridges 5, 5' and 5". In this embodiment, the bridges 5 and 5" connect the metal strips 20 and 20"', and make contact on their undersides with the heating elements 4 and 4" which latter make contact with the strip 20', via their main faces turned toward the latter strip.

The bridge 5', on the other hand, connects the metal strips 20' and 2"' with each other, while electric current passes from the post 6 of the strip 20"', which post is connected to the negative pole of a motor car battery, through the heating wire of the heating element 4' into the strip 20" and via the post 6' of the latter back to the plus pole of the battery.

I claim:

1. Multiple component electrical heating means for mirrors comprising: thin metal sheet means and at least one plate-shaped electrical heating element having two main faces being connected with the said metal sheet means in an electrical current-conducting and heat-conducting manner;

said metal sheet means consisting essentially of at least three metal strips which are spaced from one another and extend parallel with each other, the aforesaid heating element having a first one of said two main faces in electrical current- and heat-conducting contact with at least a first one of the said metal strips and said first one of said faces being electrically and heat-insulated from the two strips next adjacent the said first metal strip, and a metal bridge connecting with one another, in electrical current- and heat-conducting contact, the said two strips next adjacent said first metal strip;

the other main face of the said heating element being in electrical current- and heat-conducting contact with the said metal bridge.

2. The heating layer of claim 1, wherein said at least one heating element has a diameter and those metal strips being directly connected with a main surface of said at least one heating element each have a width at least equal to the diameter of the respective heating element with which that metal strip is directly connected.

* * * * *